United States Patent Office 2,852,476
Patented Sept. 16, 1958

2,852,476

COATING COMPOSITION CONSISTING OF AN OIL-MODIFIED ALKYD RESIN, AN AMINE ALDEHYDE RESIN, AND A SYNTHETIC RESIN LATEX AND THE METHOD OF PREPARING SAME

Lowell O. Cummings, Milwaukee, Wis., assignor to Pittsburgh Plate Glass Company, Allegheny County, Pa., a corporation of Pennsylvania No Drawing. Application August 17, 1954
Serial No. 450,544

9 Claims. (Cl. 260—21)

This invention relates to water dispersed coating compositions capable of forming hard, glossy, flexible films, and pertains more particularly to water dispersed baking enamels formed essentially from resinous components including a water dispersible alkyd resin, an amine-aldehyde resin, and a synthetic polymeric latex.

In recent years there has been an ever increasing trend toward the use of aqueous vehicles in coating compositions. The remarkable growth in the use of these water based materials has been due primarily to several factors: (a) the substitution of water for organic solvents greatly reduces the cost of the coating material and eliminates the need for costly solvent recovery equipment, (b) the use of water as a vehicle eliminates the flammability hazard which the highly volatile solvents present, and (c) the sometimes disagreeable odors of the solvents utilized are eliminated.

Heretofore, however, it has not been possible to produce a useful baking enamel having an aqueous vehicle. Previous attempts to produce such a material resulted in discontinuous films, poor adhesion, poor flexibility, lack of film strength and other serious disadvantages. Consequently, the use of aqueous vehicles in coating compositions has been limited to air drying compositions such as are utilized on the interior surfaces of homes, offices, and factory buildings. Such compositions ordinarily contain as the sole resinous component a butadiene-styrene polymeric latex. It has now been discovered that useful water dispersed coating compositions can be formed by utilizing as resinous components thereof, a water dispersible alkyd resin, an amine-aldehyde resin, and a synthetic polymeric latex. The resulting compositions form films which are hard, glossy and flexible, and which possess excellent mar and water resistance. The coating compositions can be applied by brushing, spraying, dipping or flow coating and dry readily when baked at temperatures of about 250° F. to 350° F. for periods of about 30 minutes.

It is quite surprising that clear, glossy films are obtained from two highly polar materials such as an amine-aldehyde resin and a water-dispersible alkyd resin, in combination with a non-polar synthetic polymeric latex. Synthetic polymeric latices such as polystyrene latices do not ordinarily deposit continuous films when applied as aqueous emulsions to surfaces such as metal, wood, and the like, even when utilized in combination with various other materials. For example, films obtained from a blend of polystyrene and certain water dispersible alkyd resins tend to be soft, of poor quality, and of little or no utility.

One component utilized in preparing the coating compositions of this invention is an alkyd resin having a relatively large excess of carboxyl groups, that is, having a high acid number (ordinarily about 50 to 70), which has been treated with ammonia or an amine so as to form the ammonium salt of the alkyd resin. The resulting salt ordinarily is readily dissolved in water, and if it is not soluble per se, solubility can ordinarily be obtained by the addition of a small amount of ethanol or other lower alkyl alcohol.

Normally, the water dispersible ammonia salts of high acid value alkyds are obtained by first preparing a conventional alkyd resin such as are readily obtainable as commercial products. Such alkyds can be prepared, for example, by heating an acid or anhydride such as phthalic anhydride with glycerol, together with a drying oil derivative modified by ester interchange with glycerol in order to form the monoglycerides or diglycerides of fatty acids. In some instances "oil modification" is effected by first reacting the free fatty acids of a glyceride oil, ordinarily a drying oil, with glycerol to form mono- or diglycerides or mixtures thereof. The partial esters may then be incorporated with phthalic acid and glycerol (if required) and the mixture can be heated to form a polyester. The oil modified resins can also be obtained by incorporation of the fatty acids and glycerine with phthalic acid and heating the mixture to reaction temperature. Normally, the polyesters will contain 30 percent to 60 percent and preferably about 38 percent to 55 percent by weight or slightly more or less of the glyceride oil or its equivalent of mono- or diglyceride. Such resins are ordinarily spoken of as being 30 percent to 60 percent or 38 percent to 55 percent oil modified. The total glycerol component of the mixture ordinarily should be in approximate molecular equivalency of the carboxyls of the acid or anhydride and the fatty acids of the drying oil. In some instances glycerol may be partially or completely replaced by pentaerythritol or similar materials. Preferably the alkyd resin components are heated until water is evolved as a result of the condensation reaction and is separated from the reaction zone. The reaction is continued until the acid number has fallen to 50 to 70 and preferably 60 to 65. No reflux solvent is used in preparing these alkyd resins, as they are formed by the fusion method, which involves heating the alkyd components together and blowing off the water of condensation with a stream of an inert gas, such as nitrogen.

The amine salt is then preferably prepared by stirring the warm alkyd into a water solution of ammonia or an amine such as dimethylamine, diethylamine, dibutylamine, triethylamine, ethanolamine, diethanolamine, triethanolamine, or the like, either alone or in combination with a lower alkanol which aids in solvation of the alkyd resin. It has been found that when the alkyd resin is prepared utilizing either pentaerythritol or trimethylolethane as one component thereof, it is not necessary to add ethanol or other alcohol to insure solubility of the alkyd resin. Alternatively, the amine, or ammonia, can be added to the alkyd resin. The resulting mixture is then diluted with water, which can be ordinary tap water or distilled water, to form a solution, preferably one containing about 50 percent solids.

The time required to obtain a water dispersible amine salt of an alkyd resin by the method described above varies considerably, depending upon the characteristics of the components of the resin. In general, however, an alkyd resin having the desired acid number of about 50 to 70 will be formed in about 3 to 4 hours. Ordinarily, the reaction is carried out at or near atmospheric pressure, although super-atmospheric pressures or sub-atmospheric pressures may also be utilized.

A second resinous component utilized in preparing the coating compositions of this invention is a water-soluble amine-aldehyde resin. Resins of this type are readily available as commercial materials and can be prepared by methods disclosed in the art, for example, in "Experimental Plastics and Synthetic Resins" by G. F. D'Alelio (see particularly Experiments 25A and 28A). The methods therein disclosed involve generally the condensation of urea with formaldehyde in the presence of an alkaline catalyst. For example, one preferred method involves heating a mixture of paraformaldehyde, water and catalyst until the paraformaldehyde dissolves, after which urea is added. The mixture is refluxed for about 2 hours, and the reaction mixture is cooled and filtered. The resulting solution is readily water dilutable. Acid catalysts may be used also. Other water soluble urea-formaldehyde resins may also be employed with good results.

Other amine-aldehyde resins which may be used include the water soluble resins obtained by the condensation of an aldehyde, particularly formaldehyde, with a triazine possessing the structure

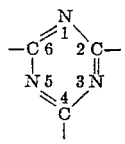

wherein at least one of the free valencies is substituted by an amine group. The preferred amine-aldehyde resin is one prepared by the condensation of melamine and formaldehyde. Melamine is the simplest triazine and possesses the structure

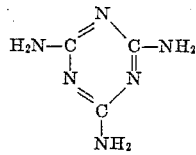

Water soluble melamine-formaldehyde resins are readily obtained, for example, by the method of U. S. Patent 2,529,856 which involves reacting a lower alkanol with a polymethylol melamine in the presence of an acid and for such length of time as is necessary to obtain a clear solution and for such a length of time as is necessary to obtain reaction of the alkanol with the polymethylol melamine, then neutralizing said solution or making it slightly alkaline, and concentrating it by distillation in high vacuum until the concentration of resin solids is at least about 80 percent. If a solid, dry resin is desired, the distillation is continued until a substantially anhydrous, viscous syrup is obtained. This syrup, upon cooling, forms a clear, water-white, resinous solid which is infinitely miscible with water, particularly at room temperature.

A similarly useful water soluble melamine-formaldehyde resin can also be obtained by heating a mixture of formaldehyde and melamine to a temperature of about 160° F., and adding to said mixture a solution of an acidic catalyst such as oxalic acid in methanol or other lower alcohols. The resulting reaction product is then distilled at reduced pressure to a solids content of about 75 percent. This product is readily soluble in water.

In addition to melamine, other amino triazines or their derivatives, for example, 2-chloro-4,6-diamino-1,3,5-triazine, 2-phenyl-4-amino-6-hydroxy-1,3,5-triazine, 2-phenyl - 4 - amino - 6 - hydroxy - 1,3,5 - triazine, 6 - methyl-2,4-diamino-1,3,5-triazine, and the like may also be utilized to prepare water soluble triazine-aldehyde resins for use in preparing the coating compositions of this invention. Water soluble dicyandiamide-urea-formaldehyde resins and water soluble guanidine-urea-formaldehyde resins may also be used.

The third resinous component of the water dispersed coating compositions prepared according to the method of this invention is a synthetic polymeric latex. A polystyrene latex containing about 50 percent solids is a greatly preferred latex for use in preparing these water dispersed coating compositions since the films obtained when polystyrene latices are utilized are superior to those obtained when other synthetic polymeric latices are employed. However, good films are also obtained when other latices such as polyvinylchloride, polyvinylidene chloride, polymethyl methacrylate, polymethyl acrylate, polyvinylacetate, or butadiene-styrene latices are used.

The respective quantities of alkyd resin, amine-aldehyde resin, and synthetic polymeric latex employed may be varied substantially without greatly affecting the film forming properties of the coating composition. However, in general, it is desired that the alkyd be present in an amount of about 20 percent to 70 percent, the amine-aldehyde resin in an amount of about 10 percent to 70 percent, and the synthetic polymeric latex in an amount of about 10 percent to 70 percent, these percentages being based upon the total non-volatile weight of the three resinous components. Best results are obtained when the three resinous components are present in approximately equal amounts by weight.

The resinous components described hereinabove can be brought together in a number of different ways to obtain useful water dispersed coating compositions. One preferred method involves first admixing the amine-aldehyde resin and the synthetic polymeric latex together with the coloring pigment, if one of the latter is used. The resulting mixture is ground in a pebble mill for approximately an hour after which a water solution of the alkyl resin salt is added and the resulting mixture stirred until smooth. The coating composition thus prepared is ready for use without further modification.

While the above described method of formulating the coating composition is preferred, other orders of addition of the resinous components may also be used with good results.

It has been found that the coating compositions thus prepared are quite stable and may be stored for relatively long periods of time without affecting the properties thereof. However, since any composition containing water is subject to the growth of bacteria, some of which may be acid forming, the pH of the coating composition may be lowered below the desired range by such bacteria. Accordingly, it is sometimes desirable to add to the coating composition a small quantity, for example, about 0.25 percent to about 1.0 percent by weight of a bactericide such as the sodium salts of o-phenylphenol, pentachlorophenol, butenylphenol, pine oil or the like. In instances where a relatively strong amine is employed in the coating composition, it may not be necessary to add a bactericide, since the amine may itself control bacterial growth.

The following examples illustrate in detail the preparation of a water dispersible alkyd resin salt, a water soluble urea-formaldehyde resin, and a water soluble melamine-formaldehyde resin, and the use of such resins in the preparation of water dispersed coating compositions, and specifically water based baking enamels. The examples are not intended to limit the invention, however, for there are numerous possible variations and modifications.

*Example I*

A resin solution was formed from an alkyd resin which in turn was made as follows:

A mixture of 1300 parts of refined linseed oil and 320 parts of glycerol was stirred and heated to 400° F. at which point 0.8 part of litharge was added. The temperature was then raised to 440° F. and held until a sample of the mixture in four parts of 95 percent ethanol was clear. Fourteen hundred and ninety parts of phthalic anhydride and 415 parts of glycerol were then added and the reaction mixture agitated at about 400° F. with mild inert gas blowing until the acid value dropped to 60–65. The reaction was of the fusion type with no reflux solvent being present. The total reaction time was approximately 4 hours.

To 100 parts of the cooled alkyd resin, 10 parts of diethylamine and 20 parts of ethanol were added. This mixture was then diluted with 70 parts of tap water to form the alkyd solution as a viscous transparent syrup. The resin thus formed had a tendency to separate into two partially soluble layers on standing, but could be made into a transparent solution by adding slightly more ethanol and diethylamine. The solids of the resulting solution was 50 percent.

Example II

Eighteen hundred fifty grams of tall oil, 334 grams glycerine, 370 grams pentaerythritol, and 946 grams of phthalic anhydride were admixed and heated for two hours at 400° F., the reaction mixture being constantly agitated with a stream of an inert gas. At the end of the two hour heating period the acid number was 65. The reaction mixture was then cooled to below 200° F. and a solution of 280 grams of dimethylamine in 2520 grams of tap water added to give an alkyd resin solution suitable for use in preparing the coating compositions of this invention.

Example III

A mixture of 1270 grams of linseed oil and 400 grams of glycerine was heated to 440° F. in the presence of 0.8 gram of litharge. The heating was continued for 1 hour at which time a sample of 1 part of the mixture in 4 parts of ethanol was clear. Three hundred fifty grams of tertiary butyl benzoic acid, 1248 grams of phthalic anhydride, and 228 grams of glycerine were then added and the temperature maintained at 400° F., utilizing an inert gas to agitate the mixture, until an acid number of 65 was reached. The reaction mixture was then cooled to just under 200° F., and a solution of 330 grams diethylamine in 3000 grams of tap water was added to give an aqueous alkyd resin solution which was utilized in the preparation of water dispersed enamels.

Example IV

Three water dispersible alkyd resins were prepared utilizing linseed oil, dehydrated castor oil, and soybean oil, respectively, as the oil component. Each of the alkyd resins was prepared as follows: A mixture of 1435 grams of the oil and 360 grams of pentaerythritol were heated to a temperature of 440° F., at which point 0.8 gram of litharge was added. To the resulting mixture was added a mixture of 1352 grams phthalic anhydride and 383 grams of pentaerythritol. After an acid number of about 65 was reached, the reaction mixture was cooled to about 200° F., and a solution of 340 grams of diethylamine in 3060 grams of tap water was added. Each of the resins thus prepared could be used to form coating compositions such as those described in the succeeding examples.

Example V

To 907 parts of 91 percent paraformaldehyde and 1500 parts of tap water were added 7.5 parts of sodium hydroxide and 16 parts of concentrated ammonium hydroxide. The resulting mixture was heated to about 120° F. for a few minutes whereupon the paraformaldehyde dissolved. Seven hundred fifty parts of urea were then added, the addition being accompanied by a moderate exothermic reaction which heated the mixture to near the boiling point. The mixture was then refluxed for 2 hours and cooled and filtered. The solids content of the resulting resin, as measured by heating a weighed portion of the resin before and after heating to 230° F. for 2 hours in an open dish, was 43–45 percent.

Example VI

Thirteen and one-tenth pounds of 37 percent formalin solution (adjusted to a pH of 7.5) and 6.8 pounds of melamine were heated to a temperature of 160° F. When the resulting solution was clear 15.6 grams of oxalic acid and 32.4 pounds of methanol were added through a sparger line, and the resulting mixture refluxed for 15 minutes at a temperature of 160° F. to 165° F. The reaction mixture was then cooled to 120° F. and the pH adjusted to 9.0. The resulting material was filtered and the methanol stripped off under vacuum at temperatures below 50° C. until a total solids of 75 percent was obtained. The final material had the following analysis:

pH _____ 8.5
Percent total solids _____ 67.7
Gardner-Holdt viscosity _____ D
Gardner-Holdt color _____ 1–2

Example VII

A black baking enamel was prepared having the following vehicle solids:

| | Percent by weight |
|---|---|
| Urea-formaldehyde resin | 33 |
| 40 percent linseed oil alkyd | 33 |
| Polystyrene latex | 33 |

Also included in the coating composition was 5 percent as solids based on the vehicle solids weight of a carbon black pigment known commercially as Aquablak L which is a 25 percent dispersion of carbon black in water.

The coating composition was prepared by first admixing the urea-formaldehyde resin, the polystyrene latex, and the black pigment. This mixture was ground on a pebble mill for about an hour, primarily to break up lumps of polystyrene that usually form from the drying out of a portion of the latex. The alkyd resin solution is then added and the composition stirred for a few minutes to insure dispersion.

The coating composition thus prepared was sprayed onto metal panels, allowed to dry in the air for a few minutes, and then baked at 300° F. for 30 minutes to give a glossy, unusually tough, but flexible film with excellent mar-resistance. The properties of the coating composition and the films prepared therefrom after baking on steel at 300° F. for 30 minutes are set forth below:

Pounds per gallon _____ 8.8
Viscosity when thinned (6 parts
   enamel to 1 part water for
   spray) _____ 38 seconds (#4 Cup)
Shelf life _____ More than one month.
Freezing and thawing _____ No effect.
Percent solids _____ 45.
Sward hardness of film _____ 34.
180° bend test _____ O. K. to very slight cracks.
Impact resistance _____ No failure at 24 inch pounds.
Gloss _____ 94.
Adhesion _____ Excellent.

Example VIII

Three additional baking enamels were prepared according to the method of Example VII, replacing the polystyrene with (1) polyvinyl chloride latex, (2) butadiene-styrene copolymer latex, and (3) polymethyl methacrylate (or polymethyl acrylate) latex, respectively. Films of the resulting coating composition on steel plate were hard and flexible and had good impact and mar resistance.

Example IX

A gray baking enamel was prepared which had the following vehicle solids content:

| Component: | Percent by weight |
|---|---|
| Urea-formaldehyde resin | 30 |
| Soybean oil alkyd (prepared according to method of Example IV) | 15 |
| Pentaerythritol alkyd | 20 |
| Polystyrene latex | 35 |

Titanium dioxide was utilized in an amount equal to 20 percent by weight of the vehicle solids. The gray color was obtained by utilizing carbon black as a tinting pigment. The coating composition was prepared by first roller milling equal weights of the titanium dioxide and the soybean oil alkyd resin. Forty grams of the resulting paste were admixed with 67 grams of a water solution of a urea-formaldehyde resin (45 percent solids) and 70 grams of polystyrene latex (50 percent solids). The resulting mixture was stirred, and 40 grams of a 50 percent oil length pentaerythritol alkyd and 10 additional grams of the soybean oil alkyd resin added to form the final coating composition.

The coating composition thus prepared was sprayed onto metal panels, allowed to dry in air for a few minutes, and then baked at about 300° F. to give a film characterized by extreme toughness and flexibility. The composition does not rust iron panels and is substantially non-flammable. The films are stable to heat as high as 450° F. for 1 hour.

*Example X*

A melamine-formaldehyde resin, prepared according to the method of Example VI, was utilized in a water dispersed coating composition containing the following vehicle solids:

| Component: | Percent by weight |
|---|---|
| Melamine-formaldehyde resin | 20 |
| Linseed oil alkyd resin (prepared according to Example I) | 45 |
| Polystyrene latex | 35 |

The coating composition was prepared by stirring 30 grams of the melamine-formaldehyde resin (68 percent solids) with 90 grams of the linseed oil alkyd resin solution, and 70 grams of polystyrene (50 percent solids). Twenty grams of carbon black (5 percent by weight of the vehicle solids and in the form of a 25 percent water dispersion) were added to give the desired black color.

The properties of films prepared from the coating composition were excellent.

In addition to using the short oil alkyds from soya oil or castor oil, it has been found that alkyds of 50 percent and 65 percent oil lengths can also be utilized by the same general procedure. An improvement is made in the 40 percent linseed alkyd (the one utilized in Example VI) by the incorporation in the alkyd of 10 percent by weight of p-tertiary butyl benzoic acid. This latter alkyd resin does not require the use of ethanol to achieve solubility in water, but only requires about 10 percent of diethylamine, or similar material to obtain a salt which forms a clear viscous solution in water and which shows no tendency to layer out on standing.

Variations can also be made in the amine-aldehyde resin. For example, the ratio of urea to formaldehyde can be varied considerably without changing substantially the properties of the resulting coating composition, and in fact, it has been found that when the formaldehyde is used in large excess, the water resistance of the coating composition tends to be improved. It has also been found possible to replace a portion of the urea or melamine with materials such as guanidine or dicyandiamide to obtain tougher films.

In addition to the components of the water dispersed coating compositions described in the specific examples hereinabove, other materials may also be added. Such materials include wetting or dispersing agents (although it is an advantage of the compositions of this invention that they do not require the use of a wetting or dispersing agent), fillers, other coloring pigments, and the like. Other resinous components, such as natural occurring resins, may also be added, although it is desirable that such materials be present only in minor amounts.

The water dispersed coating compositions obtained by the methods described hereinabove are particularly useful for application to metal surfaces because of their excellent adhesion to such surfaces, and their outstanding flexibility and impact resistance. Accordingly, they can be used effectively as finishes for toys, appliances and similar objects. The coating compositions can also be applied by spraying, dipping and brushing or flow coating to other materials which can withstand the 250° F. to 350° F. temperatures required to obtain a dry, hard, glossy film in a period of about 30 minutes.

While the compositions described in the specific examples contain color-imparting pigments, such pigments can be omitted, the resulting products depositing clear, or in some instances slightly hazy films, which are hard, flexible and which possess excellent adhesion and impact resistance. These clear, or substantially clear coating compositions are useful as "shop coats," that is, as protective coatings for parts and materials awaiting fabrication, or for similar applications.

From the foregoing description it will be apparent that the coating compositions of the present invention constitute a new and useful group of materials. It will also be apparent to those skilled in the art that numerous variations and modifications can be made in the compositions described herein without departing from the spirit and scope of the invention as defined in the appended claims.

I claim:

1. A water-dispersed coating composition comprising from 20 percent to 70 percent by weight of an amine salt of an oil modified alkyd resin having an acid value of about 50 to 70, from 10 percent to 70 percent by weight of a water-soluble amine-aldehyde resin, and from 10 percent to 70 percent by weight, based on the polymeric solids content, of a synthetic polymeric latex selected from the group consisting of polystyrene latex, polyvinyl chloride latex, butadiene-styrene copolymer latex and an acrylic resin latex.

2. The coating composition of claim 1 wherein said three resinous components are present in about equal amounts by weight.

3. The coating composition of claim 1 wherein the amine-aldehyde resin is a water-soluble urea-formaldehyde resin.

4. The coating composition of claim 1 wherein the synthetic polymeric latex is a polystyrene latex.

5. The coating composition of claim 1 having at least one pigment incorporated therein.

6. A method of preparing a water-dispersed coating composition which comprises admixing a water-soluble amine-aldehyde resin and a synthetic polymeric latex selected from the group consisting of polystyrene latex, polyvinyl chloride latex, butadiene-styrene copolymer latex and an acrylic resin latex and thereafter adding to said mixture an aqueous solution of an amine salt of an oil modified alkyl resin, the amounts of said resinous components, based upon the total non-volatile weight of the said resinous components of the coating composition being for the water-soluble amine-aldehyde resin 10 percent to 70 percent by weight, for the synthetic polymeric latex from 10 percent to 70 percent by weight based on the polymeric solid content, and for the amine salt of the oil modified alkyd resin from 20 percent to 70 percent by weight, based on the resin solids content of said aqueous solution thereof.

7. The method of claim 6 wherein the amine-aldehyde resin is a water-soluble urea-formaldehyde resin.

8. The method of claim 6 wherein the synthetic polymeric latex is a polystyrene latex.

9. The method of claim 6 wherein at least one pigment is added to said coating composition.

References Cited in the file of this patent

UNITED STATES PATENTS

| 2,166,542 | Bradley | July 18, 1939 |
| 2,400,054 | Robinson et al. | May 7, 1946 |
| 2,511,113 | La Piana | June 13, 1950 |